(12) United States Patent
Montestruque et al.

(10) Patent No.: US 9,689,732 B1
(45) Date of Patent: Jun. 27, 2017

(54) DATA ANALYSIS TOOL FOR SEWER SYSTEMS

(75) Inventors: Luis A. Montestruque, South Bend, IN (US); Patrick M. Henthorn, South Bend, IN (US); Brent P. Hussung, Mishawaka, IN (US)

(73) Assignee: EMNET, LLC, South Bend, IN (US)

( * ) Notice: Subject to any disclaimer, the term of this patent is extended or adjusted under 35 U.S.C. 154(b) by 217 days.

(21) Appl. No.: 13/168,496

(22) Filed: Jun. 24, 2011

Related U.S. Application Data

(60) Provisional application No. 61/398,345, filed on Jun. 24, 2010.

(51) Int. Cl.
*G01F 23/00* (2006.01)
*G01F 1/20* (2006.01)

(52) U.S. Cl.
CPC ............... *G01F 23/00* (2013.01); *G01F 1/20* (2013.01)

(58) Field of Classification Search
CPC .......... G01F 1/20; G01F 23/00; G06F 11/323; G06F 11/3409; G06F 11/3466; G06F 2201/865; G06F 3/0482
See application file for complete search history.

(56) References Cited

U.S. PATENT DOCUMENTS

| 4,070,563 | A | * | 1/1978 | Petroff | 702/47 |
| 4,987,913 | A | * | 1/1991 | Kodate | E03F 5/22 137/1 |
| 2002/0177907 | A1 | * | 11/2002 | Hand | G06F 11/323 700/1 |
| 2004/0001108 | A1 | * | 1/2004 | Craig | G06Q 10/109 715/839 |
| 2008/0155064 | A1 | * | 6/2008 | Kosuge et al. | 709/219 |
| 2009/0105969 | A1 | * | 4/2009 | Saylor | 702/47 |
| 2010/0303450 | A1 | * | 12/2010 | Davies | G06F 3/04847 386/349 |

OTHER PUBLICATIONS

Quigley et al., New Directions in Real-Time and Dynamic Control for Stormwater Management and Low Impact Development, World Environmental and Water Resources Congress 2008 Ahupua'a, Copyright ASCE 2008.*

* cited by examiner

*Primary Examiner* — Gregory J Toatley
*Assistant Examiner* — Kyle R Quigley
(74) *Attorney, Agent, or Firm* — EcoTech Law Group P.C.

(57) ABSTRACT

An analysis tool for monitoring and displaying the real time and historical hydraulic conditions in a sewer system as measured by monitors distributed throughout the sewer system and associated weather data. Data about the hydraulic conditions of the sewer system are displayed in a graphical display that incorporates a visual representation of the sewer system infrastructure.

13 Claims, 7 Drawing Sheets

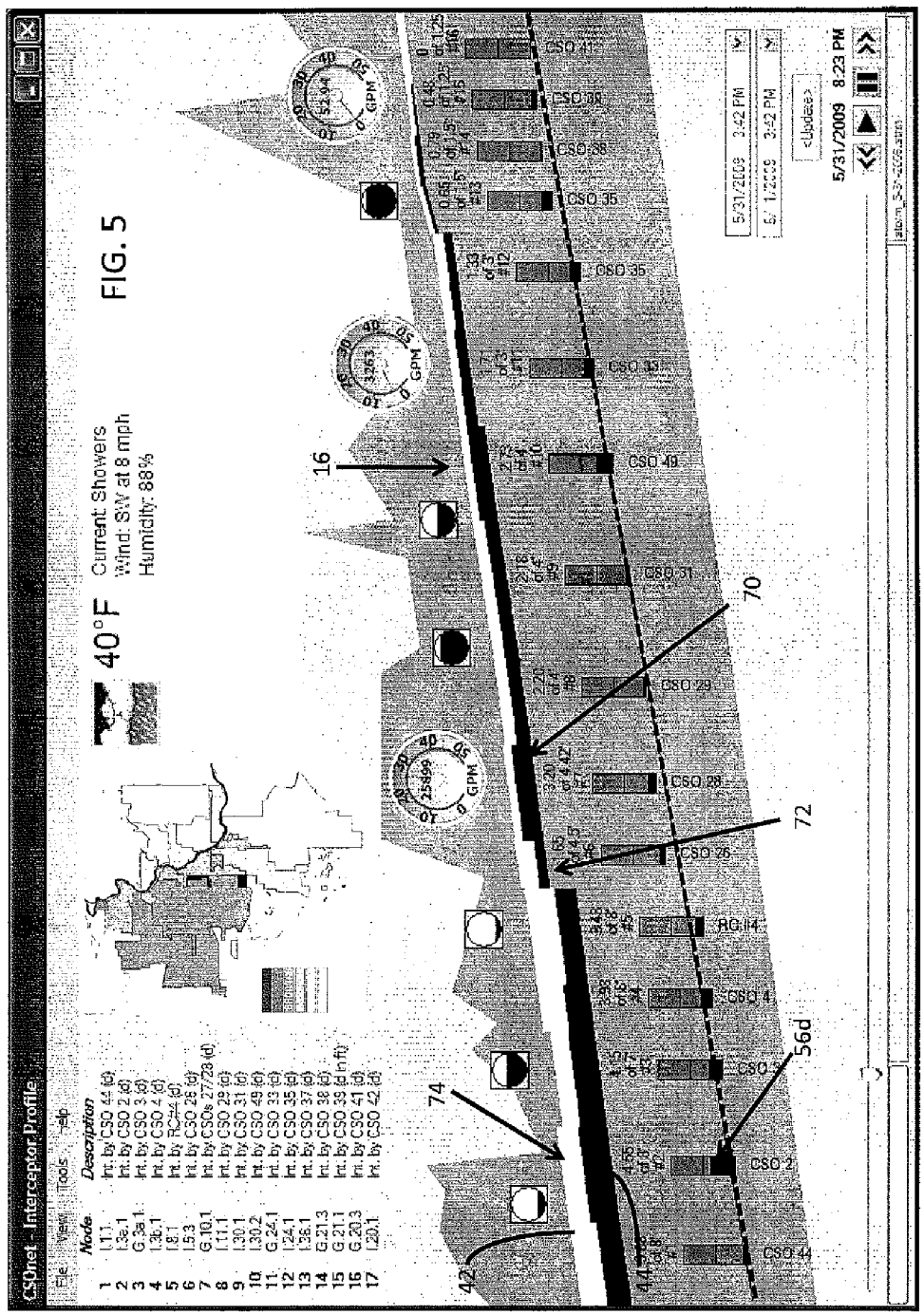

DATA ANALYSIS TOOL FOR SEWER SYSTEMS

CROSS REFERENCE TO RELATED APPLICATIONS

This application claims the benefit of U.S. Provisional Application No. 61/398,345, filed Jun. 24, 2010, the disclosure of which is hereby incorporated by reference.

BACKGROUND OF THE INVENTION

Evaluation of the hydraulic performance of sewer systems presents a number of challenges. Sewer systems are not only hidden underground and difficult to access, but the hazardous conditions presented by toxic and corrosive gases inside these structures, and their massive size, limit the number of techniques available to evaluate hydraulic performance. Traditionally, sewer structures have been evaluated using sporadic visual surveys and anecdotal information. More recently, advances in electronics and sensors have lead to the availability of electronic monitors that are able to collect and transmit critical information such as flows, water levels, and water quality data. Wastewater utilities have taken advantage of these tools to study the performance of sewer systems.

Water monitors allow the user to log, and transmit in real time, hydraulic and water quality parameters that can be stored, such as in electronic databases or spreadsheets. Engineers, sewer system operators, wastewater managers and other sewer technicians analyze the data obtained from water monitors to determine hydraulic and hydrological performance of sewer systems. The analysis tools currently available make this task laborious and time consuming. These tools generally present the hydraulic and hydrological information as either time series or scatter graphs, as described as follows.

In a time series graph, data is presented in a graph that relates the parameters measured by the monitor versus a time axis. While several graphs can be super imposed, the user's ability to understand the way that the parameters relate to the physical infrastructure that is being monitored is limited.

In a scatter graph, a datum is presented as a point on a graph that relates one parameter versus another parameter. For example, a Manning's scatter graph relates the water level in a pipe with respect to the flow velocity. Frequently data from a period of time is presented as a collection of points in a graph. In a Manning's scatter graph sometimes a picture representing the diameter of the pipe is superimposed to illustrate the relationship of the water level to the diameter of the pipe. This system only allows the analysis of two parameters at a time and precludes the ability to incorporate a time reference to the data.

Time series and scatter graphs lack the ability to incorporate many variables into a single display and to have the display provide meaningful information about the physical layout of the sewer system. The analysis tool of the present invention overcomes these and other failings of the prior art.

SUMMARY OF THE INVENTION

The present invention describes a tool that can be used to analyze the hydraulic data that is collected from various water monitors simultaneously in a sewer system so as to provide real-time and historical data about the status of the sewer system. The analysis tool places the data in context with the infrastructure being monitored. The analysis tool allows a technician to monitor real-time and previously collected data and to use the data to diagnose and remediate abnormalities in the sewer system. This is accomplished by consolidating data received from sensors throughout the sewer system into a single unified tool that provides both information about the status of the sewer system and context for the data within the physical infrastructure of the sewer system.

BRIEF DESCRIPTION OF THE DRAWINGS

A preferred embodiment of this invention has been chosen wherein:

FIG. 5 is a screen capture of the analysis tool showing irregularities in the sewer system due to two blockages in the sewer system.

DESCRIPTION OF THE PREFERRED EMBODIMENT

Figure 1:
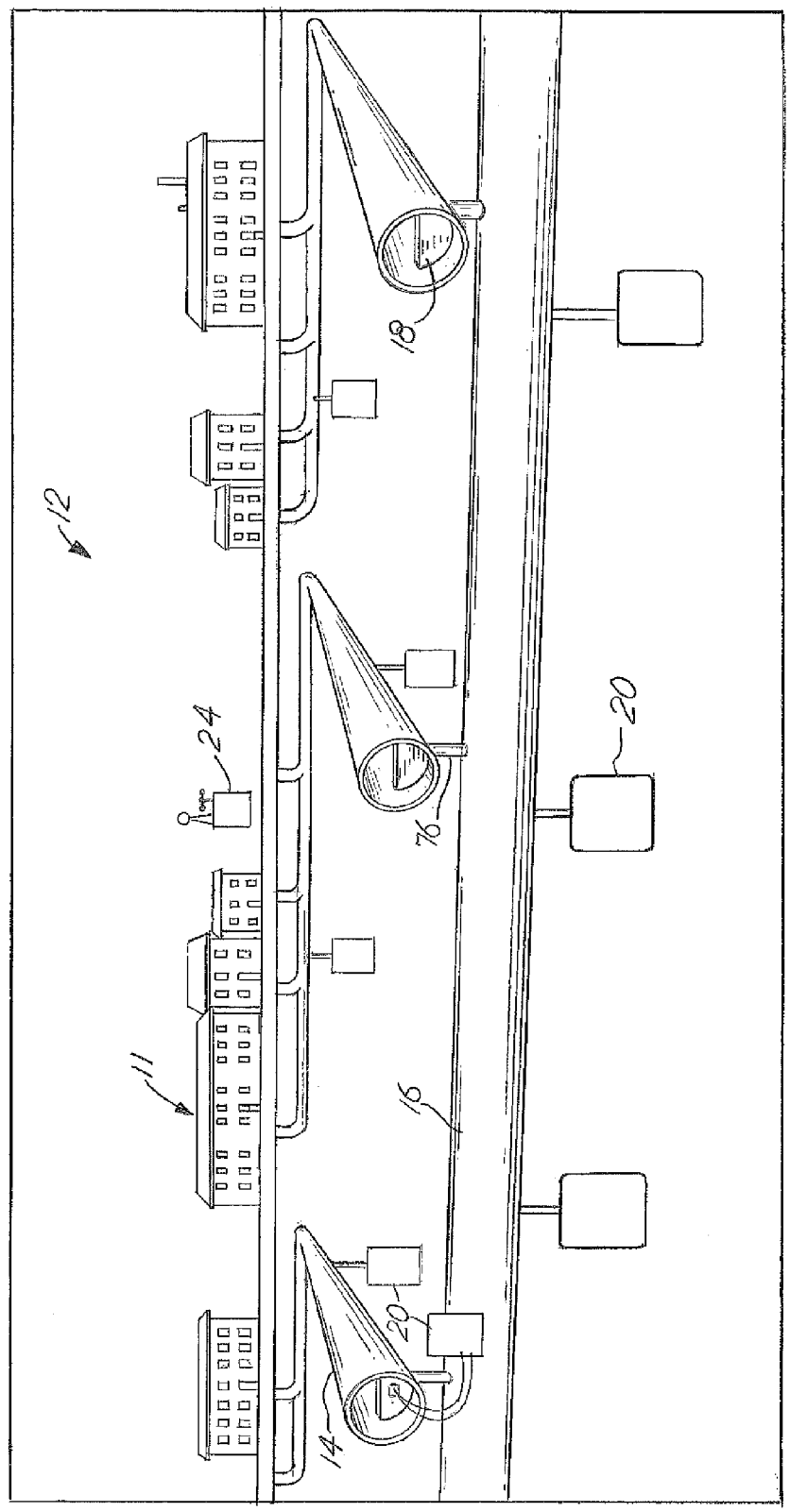
FIG. 1 is a view of a sewer system and associated monitors.

This invention relates to a data analysis tool for sewer systems. In particular, this analysis tool allows the user to identify hydraulic problems by providing real time or historical information about the sewer system—such as level, flow, water quality, and weather information—in a unified framework which displays a graphical representation of the physical structure of the sewer system with a visual representation of the hydraulic performance of the sewer system overlaid on the graphical representation of the sewer system.

The present invention allows a technician, such as an engineer, a sewer system operator, or a wastewater manager to analyze past and present sewer hydraulic data in a contextual environment that visually incorporates the elements of the sewer system in an analysis tool 10. Analysis tool 10 collects real-time information which allows the technician to perform many important functions, including, but not limited to: turning on/off pumps; actuating valves, weirs, movable gates or any other actuators to dynamically adjust the hydraulic performance of the sewer system in the presence of varying wet weather and sewer hydraulic conditions; troubleshooting hydraulic problems before any field work is performed; balancing maintenance efforts to concentrate more in areas that present frequent problems; designing and analyzing real time control strategies to optimize the hydraulic performance of the sewer network before these strategies are enacted; identifying hydraulic bottlenecks in the sewer network utilizing actual data; designing capital infrastructure projects based on a combination of hydraulic data and mathematical models; evaluating the impact of capital infrastructure projects after they have been built; and anticipating problems that may require the deployment of emergency response personnel or a control action.

Analysis tool 10 allows visualization of past and current conditions in hydraulic systems. Analysis tool 10 provides these visualizations based on inputs from various monitoring systems, including, but not limited to, real time water monitors and real time rain information. This information is relayed between the monitors and the analysis tool via a network which may be wired or wireless or a combination thereof. Analysis tool 10 displays the data received and overlays the data on a graphical representation of the sewer system. Each of these aspects of the system is described in greater detail as follows.

Real time water monitors 20 can measure a variety of water hydraulic and quality conditions. Typical monitors measure flow, velocity, level, pH, temperature, dissolved oxygen, and other conditions in the sewer system. Several manufacturers provide these kinds of monitors. An example of such a monitor is the ISCO2150 manufactured by Teledyne, Inc. The ISCO2150 can measure flow, velocity, and level in sewer systems. Water monitors 20 are installed throughout sewer system 12 and relay collected data to analysis tool 10.

Real time rain information is collected using one or more of existing technologies which provide real time rain information. Typically, a combination of rain gauges 24 and radar technology are used to provide actual and predicted precipitation information for the geographical area containing sewer system 12. The real time rain information is relayed to analysis tool 10.

A network system is used to relay information from water monitors, rain information and other collected data to the analysis tool. Telemetry systems such as the LogiCover™ provided by EmNet, LLC can be used for this function. The telemetry system may be a part of a wired or wireless network used to transmit data between the collection sources, such as the water monitors and weather gauges, and a central data repository, such as a server or other computer system.

Hydraulic and hydrological model. This is a mathematical model of the sewer system that is capable of simulating conditions in the sewer network based on rain data. An example of this tool is the United States Environmental Protection Agency Storm Water Management Model or EPASWMM.

Analysis tool 10 is a computer program designed to visually integrate all real time information and modeling information in a single framework. The analysis tool organizes and provides a visual representation of the data collected from the sewer system overlaid on a graphical representation of the structure of the sewer system. Analysis tool 10 also allows a technician to access a visual representation of historical data by selecting the time stamp of the data to be viewed.

In a typical sewer system 12, several structures are common, as shown in FIG. 1. Residential and commercial buildings 11 deposit waste in sewer system 12 via trunk lines 14. In a typical sewer system, a single trunk line 14 will be connected to a plurality of buildings. Trunk lines 14 carry waste between buildings 12 and a main pipe or interceptor line 16. One skilled in the art will appreciate that other sewer systems will vary from the layout shown in FIG. 1, and the present invention can be applied to a given layout of a sewer system. Overflow or relief points 18 are typical in sewer systems that may become overloaded under rain conditions and cause the overflow to be directed to the environment, such as to some type of reservoir 48 for collecting runoff, such as to a river, lake or other overflow collection area. Here, relief point 18 is shown as a weir which retains fluid in sewer system 12 until the fluid level eclipses the top of the weir, at which point the fluid escapes sewer system 12. Here, relief points 18 are shown on the terminal ends of trunk lines 14, though the positioning and location of the relief points may vary in other sewer system designs. Water monitors 20 are distributed throughout the sewer network and collect information on hydraulic and water quality parameters. Water monitors 20 may monitor flow rate, fluid level, fluid quality, and other fluid characteristics as are known in the art. Water monitors 20 are located throughout sewer system 12 wherever water measurements are of utility, such as at junctions between pipes, at relief points 18, or other locations throughout the system. In FIG. 1, water monitors 20 are shown as boxes connected to various parts of sewer system 12. In practice, water monitors 20 will be in, or attached to, the sewer system, whereas here the connections and the size of the monitors are exaggerated for illustrative effect. Waste in the sewer system generally flows down hill. As is shown in FIG. 1, main line 16 has a slight decline running from left to right to allow the fluid carried in the line to flow. Similarly, trunk lines 14 also flow downhill in the direction of main line 16. The analysis tool 10 of the present invention provides a graphical representation of these physical aspects of the sewer system, as detailed below.

Figure 2:
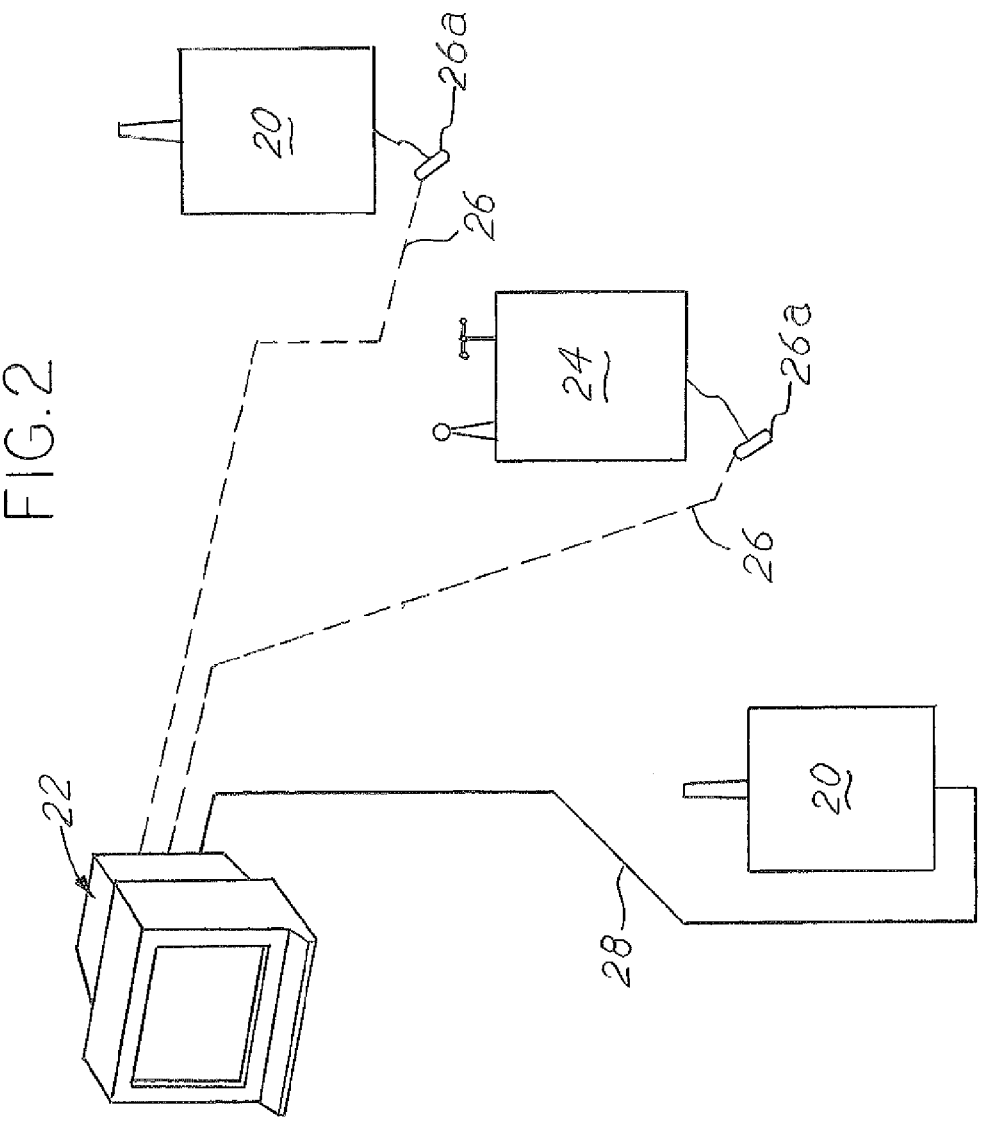
FIG. 2 is a representation of the network which relays information between the monitors and a computer.
Figure 3:
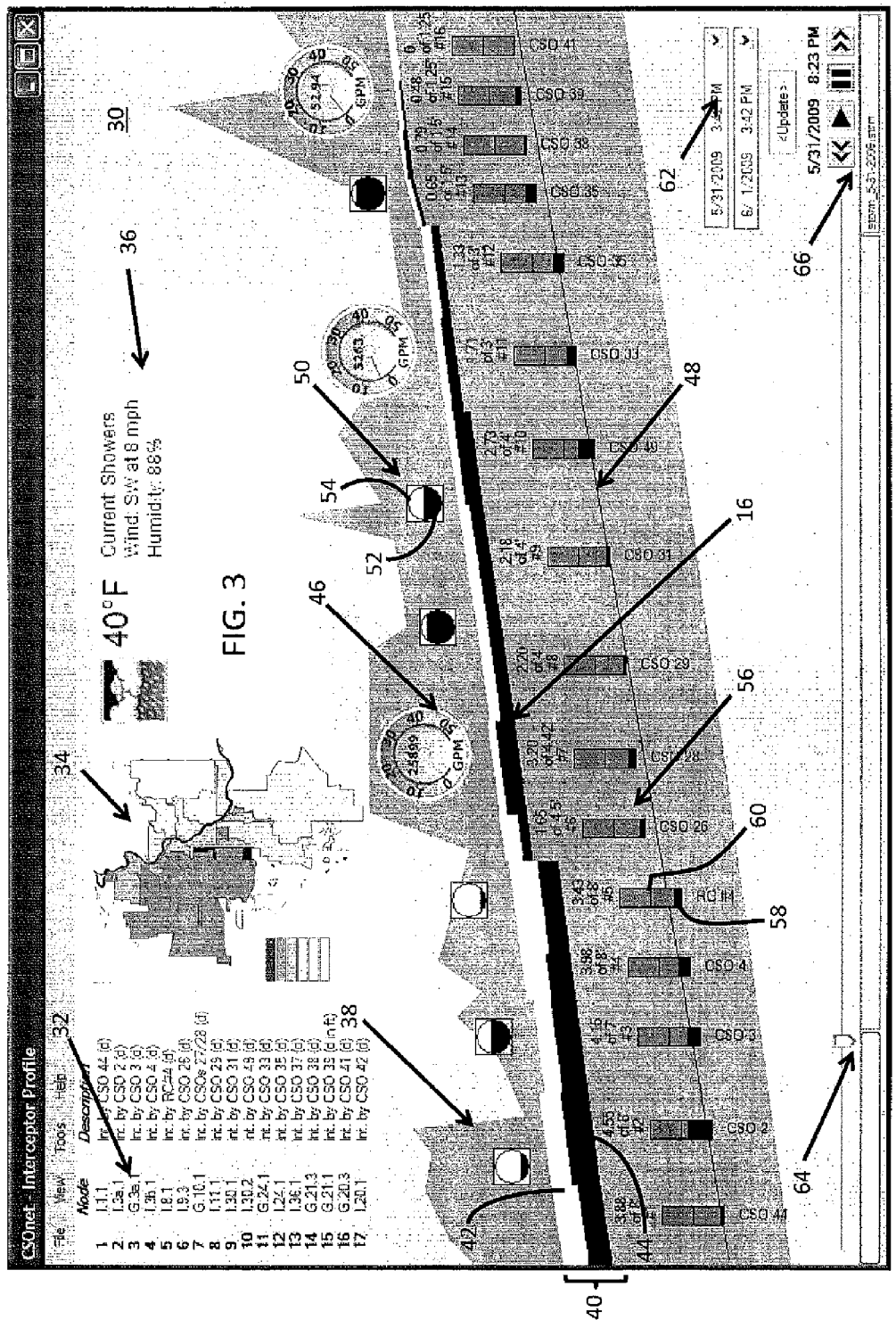
FIG. 3 is a screen capture of the analysis tool showing the various components of the tool.

A computer 22 collects data from the water monitors 20 in the sewer system illustrated in FIG. 1. The collected data comes from various sources, such as water monitors 20, weather monitors 24, weather data from third party sources, as well as other information. The data is relayed to computer 22 via a wireless 26 and/or a wired 28 network. FIG. 2 provides a representative diagram of such a network where computer 22 receives data from water monitors 20, weather monitors 24, and other sources. As illustrated in FIG. 2, water monitors 20 and weather monitors 24 may be connected via either a wired 28 or a wireless 26 network to computer 22; Such networks are well known in the art. Here, a wireless adapter 26a is shown connecting water monitor 20 and weather monitor 24 to wireless network 26, though the adapter may also be integrated into the monitor. Computer 22 is running analysis tool 10, and aggregates and creates a visual representation of the collected data. The data provided to analysis tool 10 is displayed in visual form, such as is shown in FIG. 3.

Analysis tool 10 provides a visual representation of how various aspects of a sewer system 12 are functioning in real-time and a historical representation of past performance overlaid on a graphical representation of the sewer system. Referring now to FIG. 3, a dashboard 30, displays data collected from monitors in the sewer system. This data includes a list 32 of available water monitors 20. Water monitor list 32 provides information about the monitors 20 which are currently deployed throughout the sewer system and are returning information about the hydraulic and hydrodynamic conditions in specific areas of sewer system 12. Weather information 34 is displayed on dash board 30 and provides information collected from weather monitors 24 positioned throughout the region where the sewer system is located and which collect and relay rainfall and other related weather data to display on analysis tool 10. General weather information 36 is also displayed on dashboard 30. General weather information 34 and 36 includes details of the current weather, such as temperature, wind, humidity and precipitation. Weather information 34 and 36 may come from an external sensor 24 (as shown on FIG. 1) or from weather data which is obtained from a third party source.

The collection of water monitors 20, weather monitors 24, and any other monitors associated with analysis tool 10 are collectively referred to as a sensor array. Each of the individual monitors in the sensor array collects real time data from the sewer system, and relays that information to a computer which stores the data with accompanying time stamps indicating the time the data was collected from the array. In this way, all data collected from the array at a given time will share a common time stamp which can be converted to a visual representation and overlaid on a graphical representation of the sewer system as described in more detail herein.

Analysis tool 10 displays this data in the context of the physical layout of the sewer system as follows. As a general principle, objects displayed on analysis tool 10 correspond geographically with other objects which are in the same vertical position as the first object, so as you move from left to right across analysis tool 10, a vertical line at any given point will cross all displayed objects at a given geographical position in the sewer system. The ground elevation 38 is displayed on dashboard 30 as a jagged grey area, where the vertical scale is exaggerated relative to the horizontal scale. The representation of the ground elevation 38 corresponds to the ground elevation above sewer system 12, with the ground elevation 38 and pipe diameter of main pipe 16 for a given portion of the sewer system at the same horizontal position on dashboard 30. Main pipe 16 is displayed on dashboard 30 as a declining bar bisecting the middle portion of the dashboard. Pipeline 16 shows the diameter 44 of the pipe as represented by the height 40 of the pipe—the combination of the white 42 and black 44 sections. Main pipe 16 declines from right to left across analysis tool 10, representing the vertical decline of the pipe in the sewer system. The diameter 44 of the pipe increases from right to left, indicating that the pipe size increases as it progresses downstream to allow for collection of additional waste. The water level in the pipe is represented by black portion 44, with the white portion 42 of the pipe representing the headroom above the water level in the pipe. In this case water level is monitored by a series of water level sensors 20 (as shown in FIG. 1 and listed at 32 in FIG. 3). The flow rate in pipe 16 is depicted with gauges 46 which display the water flow rate (volume/time) at points along pipeline 16. Connecting pipe segments 50 are depicted in cross section on dashboard 30. The pipe segments 50 are representations of pipes which feed pipeline 16, such as trunk lines 14 displayed in FIG. 1. Pipe segments 50 are displayed in cross section and show the water level in the pipes as black 52 and the headroom above the water as white 54, as measured by sensors in the sewer system.

River stage 48 is displayed on dashboard 30 as a dotted line which indicates the relative level of the river with respect to the rest of the sewer infrastructure. Sewer outfalls 56 are displayed on dashboard 30 and are relief points where sewer water can be released to a reservoir (e.g. rivers, lakes, or ocean). Outfalls 56 show the relative water level 58 at the outfalls in black, as measured by sensors in the sewer system. Outfalls 56 also show the level at which water will overflow out of the sewer system, as represented by line 60. The distance which water level 58 exceeds overflow line 60 is representative of the degree to which water is flowing out of outfall 56. Outfall 56 depicts how close the system is from overflowing into the environment as represented by the proximity of water level 58 to overflow level 60. The relative position of outfall 56 in sewer system 12 is displayed by the position of the outfall relative main line 16. As river stage 48 rises, dotted line 48 will rise relative to outfalls 56, such that when river state 48 exceeds overflow 60, water from the river may enter the sewer system through the outfall.

Dashboard 30 also provides functional tools, such as allow a user to view historical information either by using a date selector 62, a time slide bar 64, or controls 66. All data collected from monitors 20, weather data, and other data collected is stored in the computer with an associated time stamp. This time stamp provides a time and date reference which allows recall of all of the given data for any given date and time. Date selector 62 allows a user to select a specific date and time from drop down menus or calendars, which will return a visual depiction of the hydraulic conditions in the sewer system at that given time. Time slide bar 64 allows a user to navigate through collected data forward or backward in time by sliding the bar from left to right; sliding the bar to the left displays on analysis tool 10 depictions of previous events in the sewer system and sliding the bar to the right displays later events in the sewer system from a given time stamp. Controls 66 function similar to slide bar 64, and work similar to a CD player or VCR and allow a user to step forward or backward through time, view data as an animation using the "play" button, or stop on a given time stamp using the "pause" button. All of these time functionalities of analysis tool 10 are useful for allowing the user to navigate to different time stamps to analyze how different hydrodynamic conditions were manifested within the sewer system and to view changes during time of day, season, month, etc as maintenance and modification of the sewer system modifies functionality over time.

Figure 4:
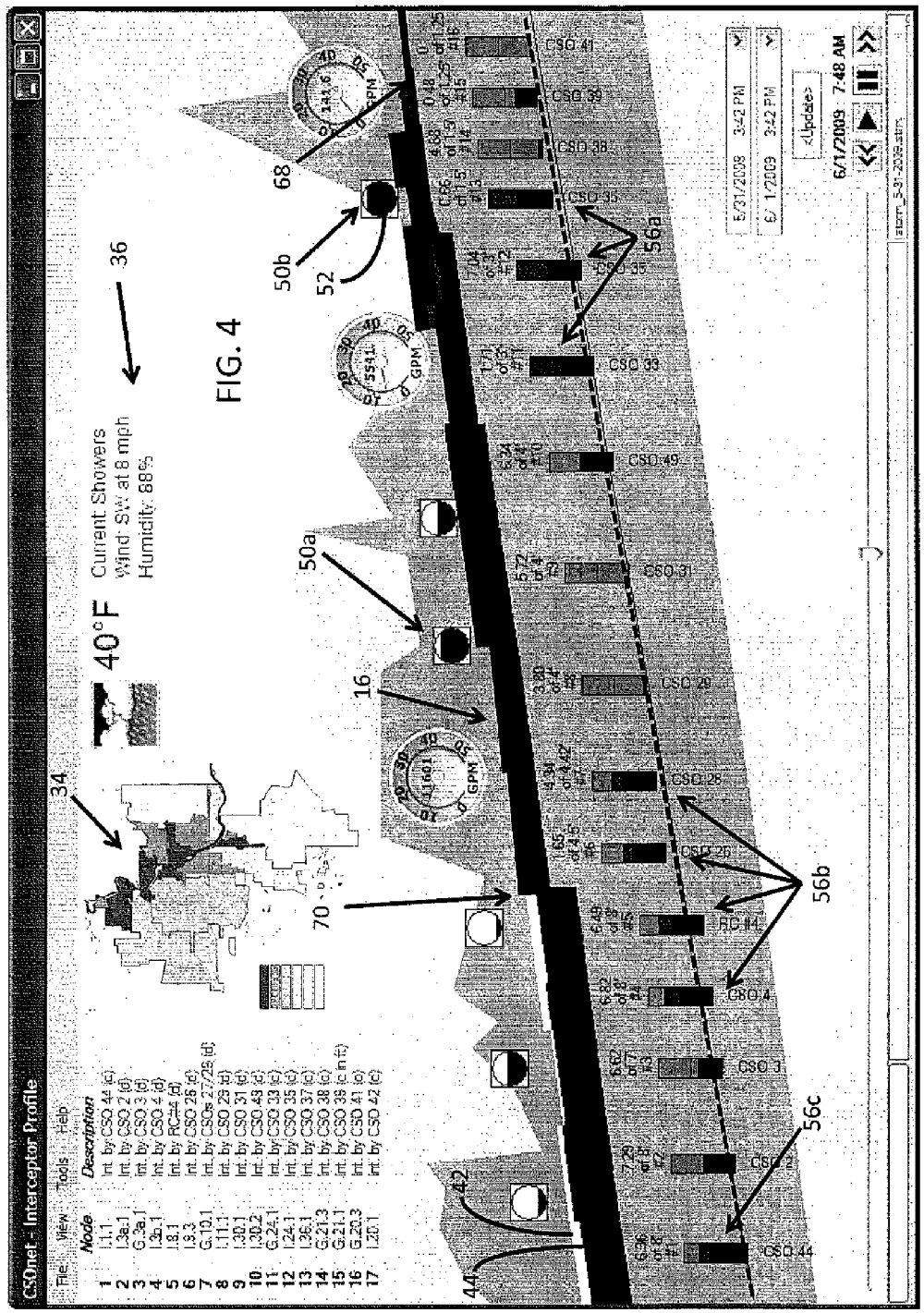
FIG. 4 is a screen capture of the analysis tool showing irregularities in the sewer system due an overcapacity of fluid.
Figure 5A:
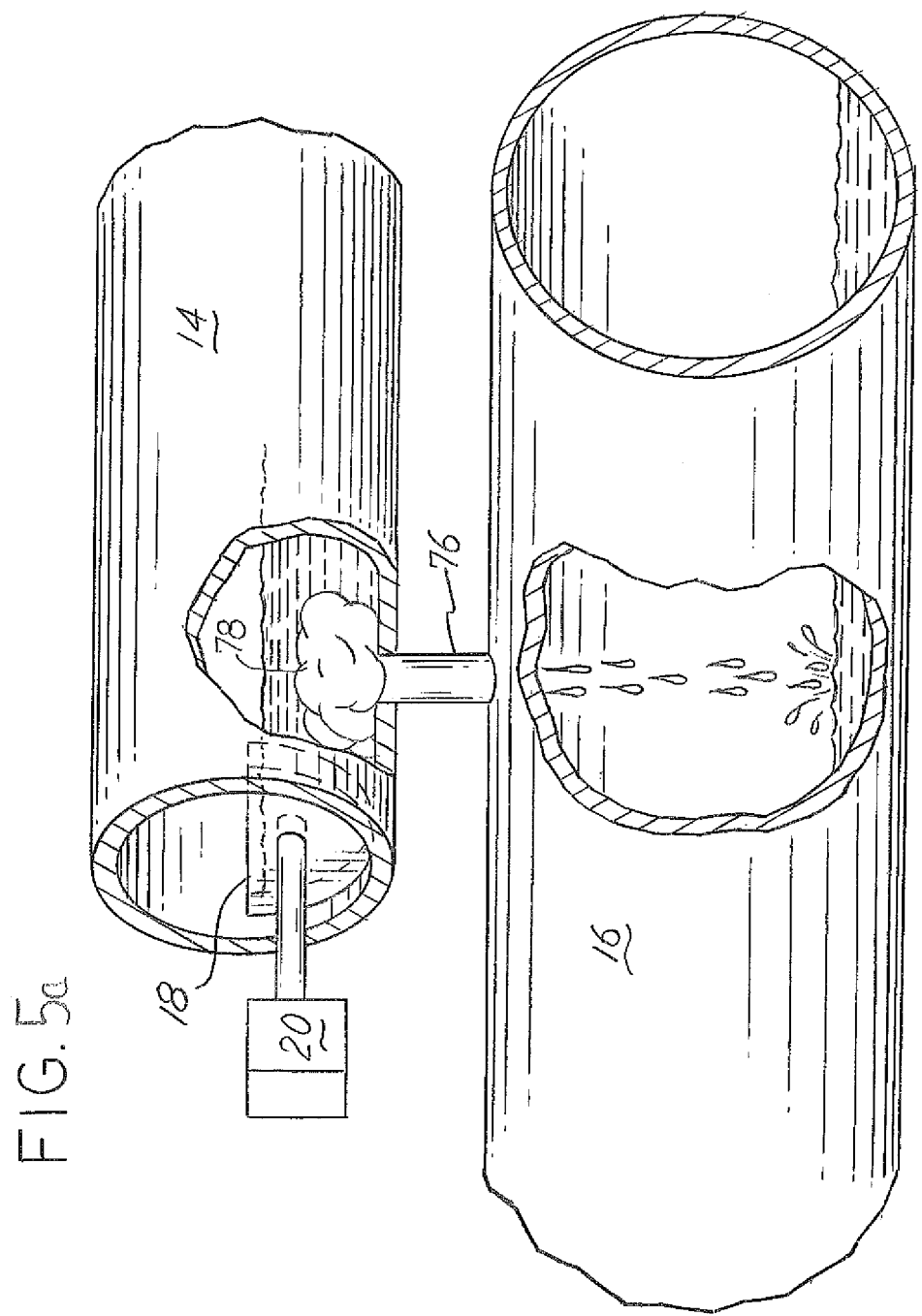
FIG. 5a is an example of a blockage in the sewer system which could cause what is shown on the analysis tool in FIG. 5.
Figure 6:
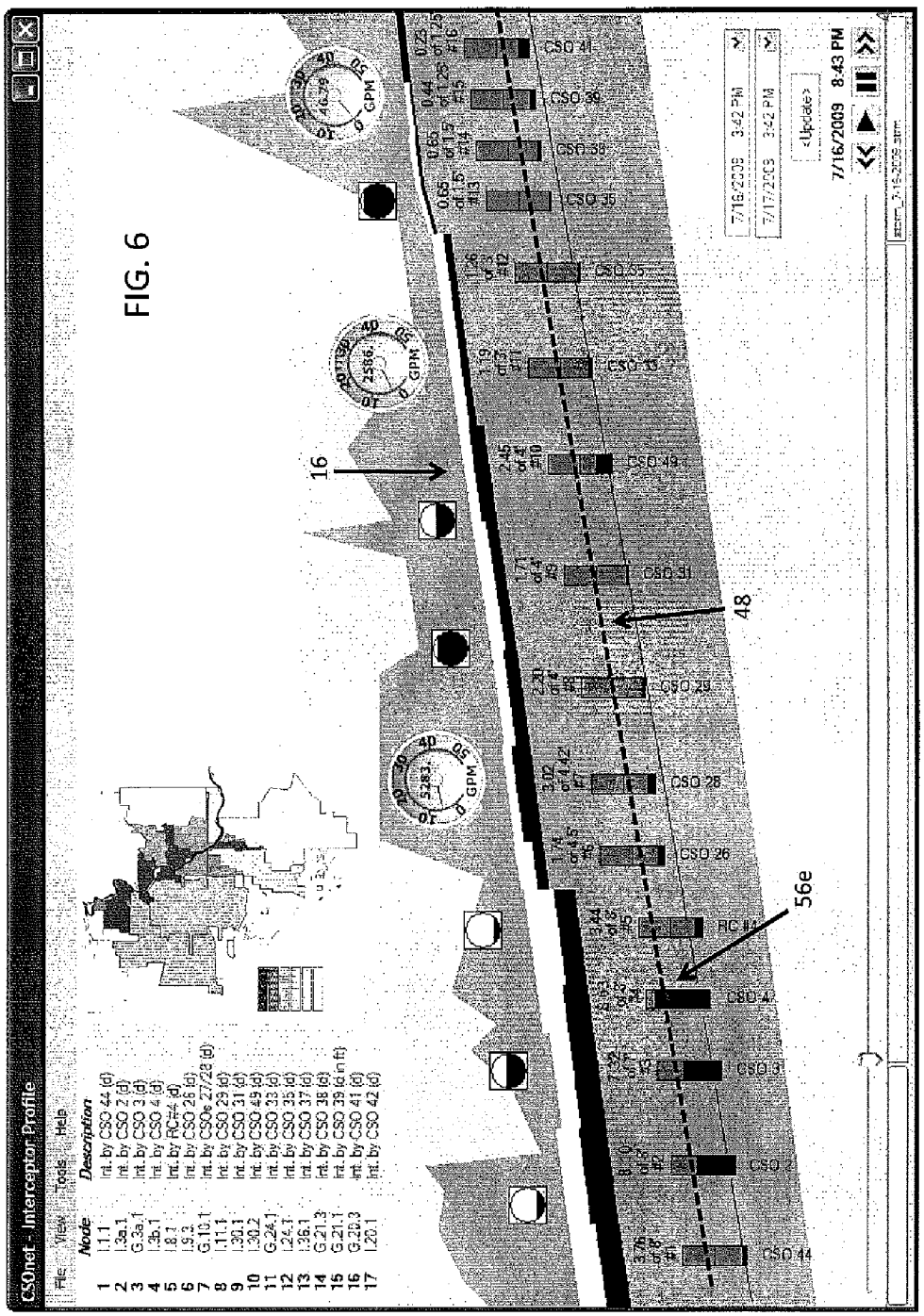
FIG. 6 is a screen capture of the analysis tool showing irregularities in the sewer system due to an increased river stage.

FIGS. 4-6 provide examples of how analysis tool 10 can be used by a technician to diagnose problems with the sewer system based on information displayed on the analysis tool.

FIG. 4 illustrates analysis tool 10 in a case where a severe storm event has caused main line 16 to become filled past capacity. The main dashboard 30 provides a few indications that would prompt a technician to investigate a main line 16 overcapacity issue. First, main line 16 is filled to capacity from roughly 68 through 70 on FIG. 4 as evidenced by the main line being filled with black (without white area representing headroom in the pipe). Second, outfalls 56a have filled with fluid past capacity, as evidenced by the shaded areas on 56a passing overflow line 60. With outfalls 56a filled past capacity, fluid is overspilling weirs 18 and entering the environment. Third, outfalls 56b and 56c are also shown as past capacity and overspilling into the environment. Such a discharge can contaminate the environment. Fourth, pipe segments 50a and 50b are shown to be nearing capacity as indicated by the water level 52. A high water level in 50a and 50b may indicate the source of the increased water in main line 16. Fifth, weather data displayed at 34 and 36 indicates a current precipitation event in the vicinity of sewer system 10. The information shown in FIG. 4 provides information to a technician to allow an appropriate response to modify sewer system controls to account for the overflow conditions and to prevent further fluid from discharging into the environment.

FIG. 5 shows the effects of two obstructions in the sewer system, and how they can be readily diagnosed using analysis tool 10. As in the previous figures, main line 16 is shown, with the water level displayed by the black area. 44, with the white area 42 representing headroom in the main line. At point 70, the water level has increased though not to the point of filling main line 16 to capacity or causing nearby outfills to overflow, while the area downstream 72, is at a lower capacity. This contrast between 70 and 72 suggests that there is an obstruction in main line 16 between 70 and 72. A technician viewing this condition on analysis tool 10 could respond by sending a worker to this portion of the sewer system to investigate a partially blocked pipe to attempt to remediate the problem.

Additionally, FIG. 5 shows evidence which could be a second obstruction as shown on analysis 10 in the feedback from outfill 56*d*. Here, 56*d* is shown to be approaching overflow capacity, without a corresponding increase in the level of main pipe 16 at point 74. This information suggests that something is causing an increase of fluid at outfill 56*d*, but is also preventing a corresponding increase at that area of main line 16. A technician viewing this on analysis tool 10 would likely conclude that there is a partial blockage between outfill 56*d* and mainline 16 which should be investigated and remediated as appropriate. A diagram of one situation which could be causing this condition is provided in FIG. 5*a*. Here, a blockage 78 is shown in trunk line 14 at connector 76. Blockage 78 is causing the water level in trunk line 14 to rise as indicated by the output from water level sensor 20 on weir 18. Blockage 78 is restricting fluid flow from trunk line 14 to main line 16, as such FIG. 5*a* is one example of a condition that could be causing what is displayed in FIG. 5. The information displayed in FIG. 5 is a significant improvement over a sewer system which does not incorporate analysis tool 10. Here, a technician is able to react to information on analysis tool 10 to make targeted remediation plans rather than hunting and guessing throughout the sewer system as had traditionally been done.

FIG. 6 shows another problem with the sewer system which can be diagnosed with analysis tool 10. In FIG. 6, an overflow is shown at outfill 56*e* without a corresponding increase in fluid in main line 16. Dotted line 48 shows the level of the river. Here, a technician using analysis tool 10 could conclude that the river has risen to the point that river water is flowing from the river into the sewer system at 56*e*, causing the backflow condition, and could order modifications to the sewer system to remediate the problem as appropriate to prevent river water from continuing to flow into the sewer system.

FIGS. 4-6 are representations of how analysis tool 10 can be used to diagnose various problem in the sewer system. These Examples are not an exhaustive list of the ways the analysis tool can be used, and these Examples should not be read to limit the present invention.

What is claimed is:

1. A method of processing and displaying hydraulic conditions along a length of a pipe of a sewer system, said method executed on a computing device including a processor for executing a program and a memory for storing the program, the method comprising:
   receiving, for a period of time, time-stamped water level data from a plurality of water level monitors each of which is disposed to measure water levels upstream or downstream of an outfall located in said sewer system;
   accepting a user-selected time within said period of time;
   determining, for each of said plurality of water level monitors, one or more values of water level data at said accepted user-selected time from said time-stamped water level data; and
   displaying, on a display, a visual representation of said outfall at said user-selected time, said visual representation of said outfall having a vertical bar object associated with said outfall, and wherein said vertical bar object indicates a value of water level in said pipe located upstream from said outfall, a level at which water will overflow out of said sewer system, and a level of water downstream of said outfall, such that a viewer of said display is allowed to determine for said user selected time if water will stay in said sewer system, will flow from said sewer system to a reservoir, and/or will flow from said reservoir into said sewer system.

2. The method of processing and displaying hydraulic conditions along a length of pipe of a sewer system of claim 1, further comprising:
   displaying, on said display, a schematic view of said pipe at said user-selected time according to a vertical scale relative to a ground elevation, said schematic view including: 1) a variation of pipe height along said pipe and 2) a visual indication of height of water along said length of said pipe utilizing one or more of said values of water level data along said pipe, such that said water level and headroom along said length of said pipe are displayed.

3. The method of processing and displaying hydraulic conditions along a length of pipe of a sewer system of claim 1, further comprising:
   displaying, on said display, a plurality of water flow rate gauges, each of which corresponds to one of a plurality of water flow rate monitors, and each of said plurality of rate gauges presents flow conditions at said user-selected time along said length of said pipe that are determined by a corresponding water flow rate monitor.

4. The method of processing and displaying hydraulic conditions along a length of pipe of a sewer system of claim 1, wherein a visual representation of said length of pipe is displayed according to a vertical scale relative to said length of pipe diameter.

5. The method of processing and displaying hydraulic conditions along a length of pipe of a sewer system of claim 1, further includes displaying a time control tool on said display, and where said accepting accepts a user input to said time control tool.

6. The method of processing and displaying hydraulic conditions along a length of pipe of a sewer system of claim 5, wherein said time control tool includes a date selector, and wherein said user input is a date and time selected from a drop-down menu or calendar on said display.

7. The method of processing and displaying hydraulic conditions along a length of pipe of a sewer system of claim 5, wherein displaying further includes displaying said water level and/or said flow rates at sequential times, where said time control tool includes media control buttons, where said media control button includes a play button, such that when said play button is selected, said display presents said water level and/or said flow rates at sequential times.

8. The method of processing and displaying hydraulic conditions along a length of pipe of a sewer system of claim 7, wherein said media control buttons tool includes a pause button, a back button and a forward button, such that said user may control said display of water level and said flow rates.

9. The method of processing and displaying hydraulic conditions along a length of pipe of a sewer system of claim 5, wherein said time control tool includes a time slide bar, and wherein said user input is movement of a sliding element on said display.

10. The method of processing and displaying hydraulic conditions along a length of pipe of a sewer system of claim 2, wherein said plurality of water level monitors includes water level monitors in a trunk lines generally providing water into a main pipe of said sewer system, said method further comprising:

displaying, on said display, a schematic view of said trunk line, wherein said schematic view of said trunk lines is a visual representation of water level and headroom in said trunk line.

11. The method of processing and displaying hydraulic conditions along a length of pipe of a sewer system of claim 1, wherein said water level downstream of said outfall is a river stage.

12. A method of processing and displaying hydraulic conditions along a length of a pipe of a sewer system, said method executed on a computing device including a processor for executing a program and a memory for storing the program, the method comprising:
  receiving, for a period of time, time-stamped water level data from a plurality of water level monitors each of which is disposed to measure water levels upstream or downstream of an outfall located in said sewer system;
  accepting a user-selected time within said period of time;
  determining, for each of said plurality of water level monitors, one or more values of water level data at said accepted user-selected time from said time-stamped water level data; and
  displaying, on a display, 1) a visual representation of said outfall at said user-selected time, said visual representation of said outfall indicating a value of water level in said pipe located upstream from said outfall, a level at which water will overflow out of said sewer system, and a level of water downstream of said outfall, such that a viewer of said display is capable of determining if water will stay in said sewer system, will flow from said sewer system to a reservoir, and/or will flow from said reservoir into said sewer system and 2) a visual representation of said length of pipe displayed according to a vertical scale relative to said length of pipe diameter.

13. A method of processing and displaying hydraulic conditions along a length of a pipe of a sewer system, said method executed on a computing device including a processor for executing a program and a memory for storing the program, the method comprising:
  receiving, for a period of time, time-stamped water level data from a plurality of water level monitors each of which is disposed to measure water levels upstream or downstream of an outfall located in said sewer system;
  accepting a user-selected time within said period of time;
  determining, for each of said plurality of water level monitors, one or more values of water level data at said accepted user-selected time from said time-stamped water level data;
  displaying, on a display, 1) a visual representation of said outfall at said user-selected time, said visual representation of said outfall indicating a value of water level in said pipe located upstream from said outfall, a level at which water will overflow out of said sewer system, and a level of water downstream of said outfall, such that a viewer of said display is capable of determining if water will stay in said sewer system, will flow from said sewer system to a reservoir, and/or will flow from said reservoir into said sewer system and 2) a plurality of water flow rate gauges, each of which corresponds to one of a plurality of water flow rate monitors, and each of said plurality of rate gauges presents flow conditions at said user-selected time along said length of said pipe that are determined by a corresponding water flow rate monitor.

\* \* \* \* \*